United States Patent [19]
Bäbler

[11] Patent Number: 5,851,279
[45] Date of Patent: Dec. 22, 1998

[54] COPPER PHTHALOCYANINE PIGMENT

[75] Inventor: Fridolin Bäbler, Hockessin, Del.

[73] Assignee: Ciba Specialty Chemicals Corporation, Tarrytown, N.Y.

[21] Appl. No.: 806,489

[22] Filed: Feb. 27, 1997

Related U.S. Application Data

[60] Provisional application No. 60/012,664 Mar. 1, 1996.
[51] Int. Cl.$^6$ ...................................................... C09C 67/50
[52] U.S. Cl. ...................... 106/410; 106/162.7; 106/411; 106/412; 106/413; 106/417; 106/418; 106/437; 106/499; 523/200
[58] Field of Search ...................................... 106/412, 410, 106/411, 413, 417, 418, 437, 499, 162.7; 523/200

[56] References Cited

U.S. PATENT DOCUMENTS

| | | | |
|---|---|---|---|
| 4,370,270 | 1/1983 | Bock et al. | 540/141 |
| 4,610,395 | 9/1986 | Ford | 241/5 |
| 4,811,907 | 3/1989 | Niemi et al. | 241/5 |
| 5,584,922 | 12/1996 | Bäbler | 106/417 |

FOREIGN PATENT DOCUMENTS

| | | |
|---|---|---|
| 0042507 | 12/1981 | European Pat. Off. . |
| 0604034 | 6/1994 | European Pat. Off. . |
| 0702055 | 3/1996 | European Pat. Off. . |
| 0702062 | 3/1996 | European Pat. Off. . |
| 1042960 | 11/1993 | France . |
| 3201778 | 10/1983 | Germany . |

*Primary Examiner*—Mark L. Bell
*Assistant Examiner*—Scott L. Hertzog
*Attorney, Agent, or Firm*—Kevin T. Mansfield

[57] ABSTRACT

A new copper phthalocyanine pigment characterized by masstone and tint reflection spectra is disclosed. The new copper phthalocyanine pigment is especially useful for coloring coating compositions, such as automotive paints, and plastics. Also disclosed is a new process for preparing a conditioned pigment wherein a pigment crude is air jet milled.

16 Claims, 2 Drawing Sheets

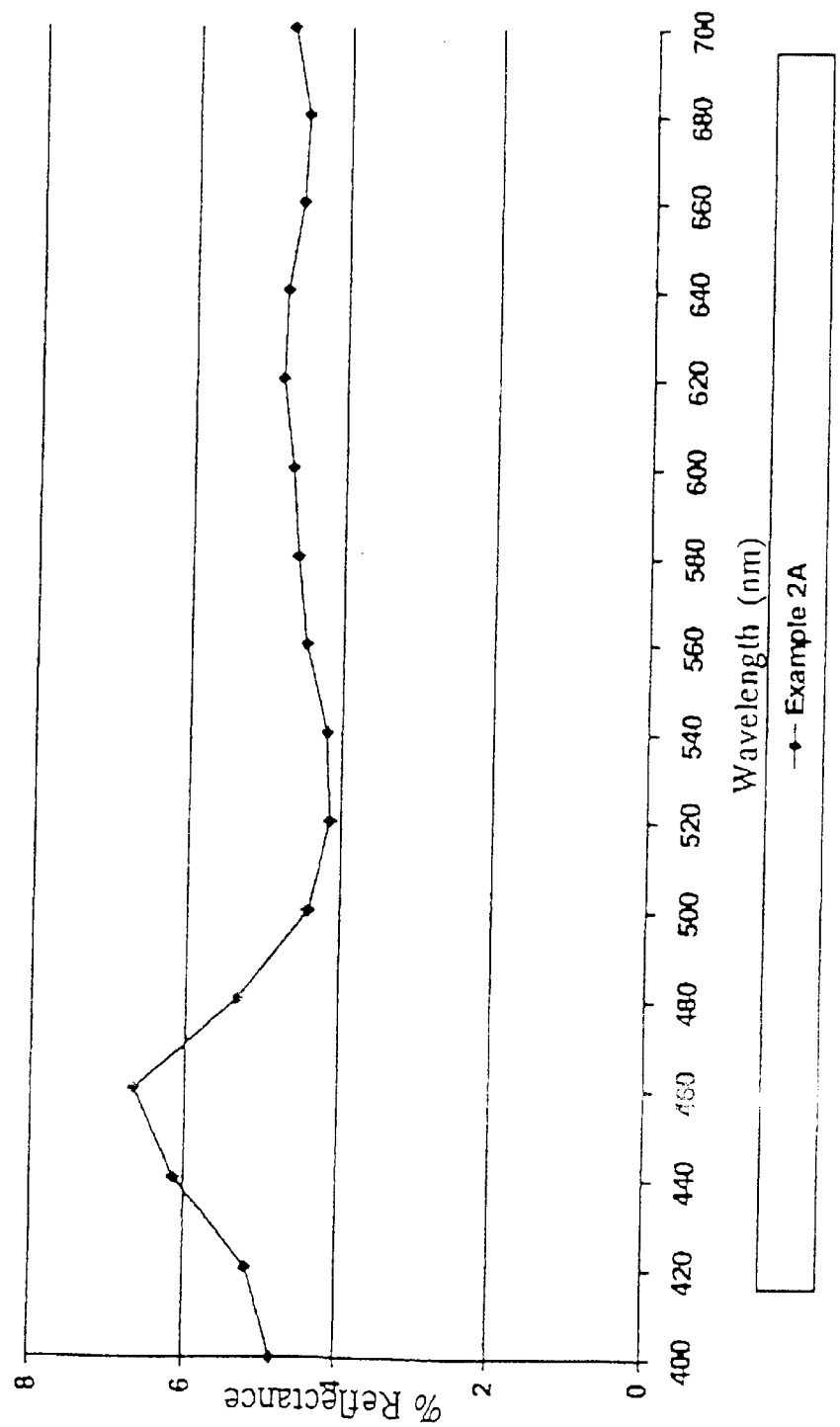

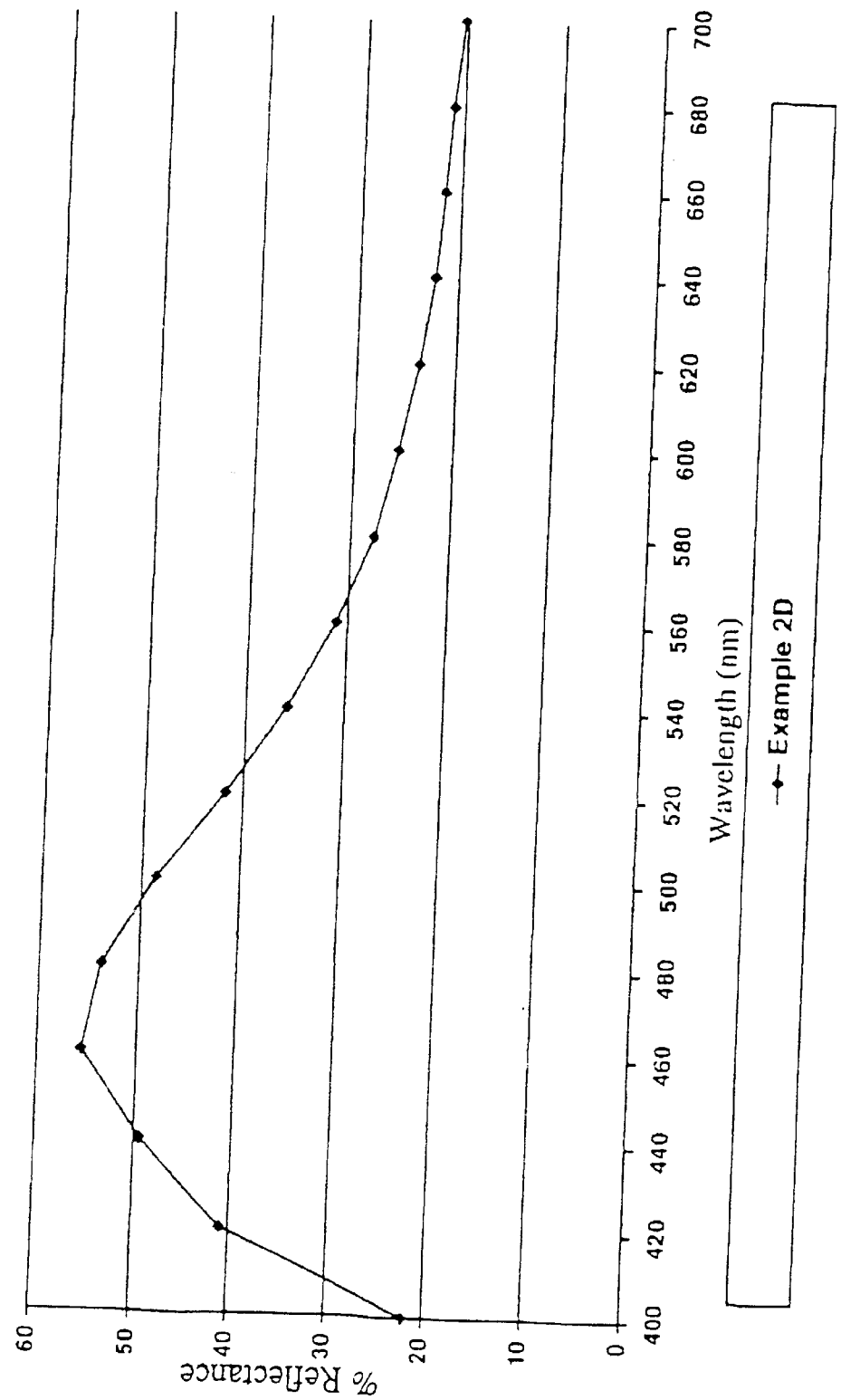

COPPER PHTHALOCYANINE PIGMENT

This application claims the benefit of Provisional Application No. 60/012,664, filed Mar. 1, 1996.

SUMMARY

This application relates to a beta copper phthalocyanine pigment having unique coloristic properties and its use as a pigment in high-molecular-weight organic materials, especially coating compositions, plastics and fibers.

BACKGROUND

Copper phthalocyanine pigments are known for their attractive blue color and outstanding fastness properties. The alpha and beta crystal modifications of copper phthalocyanine are particularly interesting as pigments. The preparation of pigmentary alpha and beta forms of copper phthalocyanine, for example by conditioning, is well-known in the art.

Small particle size copper phthalocyanine pigments having an average particle size below 0.1 μm are especially interesting and used in large quantities on the worldwide pigment market due to their high color strength and high saturation.

Large particle size copper phthalocyanines are also known in the art, primarily in platelet crystal form. Large particle size, platelet-shaped copper phthalocyanine pigments are generally used as effect pigments. For example, U.S. Pat. No. 4,370,270 discloses a large particle size, platelet form of beta copper phthalocyanine which has a reflection maxima between 610 and 640 and between 710 and 740 nm and displays optical effects similar to a metallic pigment. Although the coloristic properties of this pigment form are unique, the large platelet pigment particles tend to be shear sensitive and break easily during incorporation into a high-molecular-weight substrate, such as molded plastics, fibers and even automotive paint systems. Thus, the large particle size, platelet copper phthalocyanine pigments have the disadvantage that their opacity, color shade and effect are variable, depending on the incorporation time, method and equipment.

The present invention relates to a beta copper phthalocyanine pigment having unique and surprising color characteristics. In particular, the inventive pigment is characterized by its masstone and tint reflection spectra from 400 to 700 nm. The inventive pigment is also useful as a stir-in pigment, but more shear resistant than large particle size platelet forms of copper phthalocyanine because it has an advantageous particle size, which is generally in the range from 0.1 to 9 μm, and a non-platelet shape. Despite its smaller particle size and non-platelet shape, the inventive pigment shows the flop effects generally associated with large particle size, platelet-shaped pigments when incorporated into a coating composition, such as an automotive paint, yet generally yields coatings having a smoother and higher gloss surface due to its smaller particle size and non-platelet shape.

BRIEF DESCRIPTION OF THE DRAWINGS

FIG. 1 depicts the reflection spectra of the inventive pigment measured on a sprayed masstone coloration obtained according to Example 2A.

FIG. 2 depicts the reflection spectra of the inventive pigment measured on a sprayed 10/90 tint coloration obtained according to Example 2D.

DETAILED DESCRIPTION

The present invention relates to a copper phthalocyanine pigment which is characterized by a 10/90 tint reflection spectrum, which is measured at complete hide, having a broad peak from 400 to 700 nm with a maximum at 460 nm±10 nm, a negative slope from 480 nm to 700 nm which becomes less negative as the wavelength increases and a reflection at 700 nm that is at least 25 percent of the reflection at 460 nm. The inventive pigment is further characterized by a masstone reflection spectrum from 400 nm to 700 nm having a first peak from 400 nm to 520 nm with a maximum at 460 nm±10 nm, a second peak from 540 to 680 nm having a maximum at 630 nm±10 nm and a positive slope from 680 to 700 nm.

In order to measure the reflection spectrum, the inventive pigment is first incorporated into a substrate, such as for example a basecoat/clearcoat paint system like those described in Examples 2A and 2D. It is the reflection spectrum of the pigmented substrate, such as the coated panel or a pigmented plastic sheet which is measured. The reflection spectra are measured at "complete hide" which means that the substrate is pigmented such that any background color is not observable. For example, at "complete hide" it is not possible to see the background color of a coated panel or a background color through a pigmented plastic sheet.

The overall shape of the reflection spectra is characteristic for the inventive pigment regardless of the substrate into which the inventive pigment is incorporated. However, the percent reflectance at a particular wavelength is variable depending on the substrate.

Appropriate substrates include lacquers, inks, coating compositions, and plastics. Especially appropriate coating compositions include the basecoat/clearcoat systems conventionally used in the automotive industry. Especially appropriate plastics include the polyvinyl halides, especially polyvinyl chloride, and the polyolefins, for example low or linear low density or high density polyethylene, polypropylene, ABS and polyamide.

The expression "10/90 tint" is a commonly used expression in the pigments industry and is intended to have its usual meaning: that the substrate is pigmented by the inventive pigment in combination with titanium dioxide in a ratio of about 10 to 90. Thus, the 10/90 tint reflection spectrum is the reflection spectrum of the substrate pigmented by the inventive pigment in combination with titanium dioxide in a ratio of about 10:90.

A masstone reflectance spectrum is the reflectance spectrum observed when the inventive pigment is the only pigment used to color the substrate.

The basecoat/clearcoat coating systems, such as those used in the automotive industry, are important substrates for the inventive pigment. When incorporated into an basecoat/clearcoat paint system to complete hide, the inventive copper phthalocyanine pigment yields a masstone coated panel that is characterized by a reflection spectrum having a maxima above 6 percent at 460 nm±10 nm and a reflection at 480 nm above 5 percent, a reflection at 620 nm above 4.6 percent and a reflection at 700 nm above 4.5 percent and a 10/90 tint coated panel characterized by a reflection spectrum having a maxima above 52 percent at 460 nm±10 nm, and a reflection at 500 nm above 45 percent, a reflection at 600 nm above 22 percent and a reflection at 700 nm above 17 percent. In particular, the masstone reflection spectrum shows a reflection at 480 nm above 5.3 percent, in particular from 5.3 to 5.4 percent, a reflection at 620 nm above 4.7 percent, in particular from 4.7 to 4.9 percent, and a reflection at 700 nm above 4.7 percent, in particular from 4.7 to 4.8 percent, and the tint reflection spectrum shows a reflection at 500 nm above 47 percent, in particular above 47.5 percent, a reflection at 600 nm above 24 percent, in particular above 24.5 percent, and a reflection at 700 nm above 19 percent, in particular above 19.5 percent. Especially desirable pigments are those wherein the tint reflection spectrum is characterized by a reflection maxima at 460 nm above 55.0 percent and a reflection at 500 nm above 48.0 percent, a reflection at 600 nm above 25.0 percent and a reflection at 700 nm above 20.0 percent.

The coated panel which is used to obtain the masstone reflection spectrum described above is prepared according to present Example 2A and the 10/90 tint panel used to obtain the tint reflection spectrum is prepared according to present Example 2D. The inventive pigment is utilized as a stir-in pigment in both of Examples 2A and 2D.

In general, at least 95 percent of the particles in the inventive pigment have a particle size in the range from 0.1 micrometers to 9 micrometers with at least 50 percent of the particles having a particle size in the range from 0.5 micrometers to 3.5 micrometers. Preferably, at least 50 percent of the particles have a particle size in the range from 0.8 to 2.5 micrometers. The largest dimension (e.g. length) of the pigment particle is measured to determine the particle size.

Particle size is determined by an electron micrograph or by laser diffraction using a Fraunhofer diffraction instrument. However, electron microscopy is a more reliable method for determining the presence of small particles, for example those with a particle size below 0.1 micrometers.

The inventive copper phthalocyanine pigment is not platelet-shaped. In particular, the inventive pigment is composed mostly of pigment particles having a prismatic shape wherein the particles have a length which is more than three times the width and the particle thickness is at least one third the width.

In the presence of an effect pigment like titanium dioxide coated mica or aluminum, the inventive pigment also shows unique flop effects in spray painted panels when incorporated into a paint system, especially a basecoat/clearcoat paint system. Such panels change color from a greenish blue to a reddish blue depending on the viewing angle. Thus, the present invention further relates to a copper phthalocyanine pigment which shows a downflop from reddish blue to greenish blue when combined with a titanium coated mica or aluminum effect pigment in a basecoat/clearcoat coating.

It is also possible to use the inventive pigment as a stir-in pigment which is uniformly dispersed in a high-molecular-weight organic material, such as a coating composition, in particular an automotive paint, simply by stirring the pigment into the composition containing the high-molecular-weight organic material, without the need for the energy and time consuming dispersion step typically required to uniformly disperse small particle size copper phthalocyanine pigments in such a medium.

The inventive pigment is prepared by direct synthesis or by an appropriate conditioning method, such as, for example, recrystallization of a premilled copper phthalocyanine in an appropriate organic solvent or mechanically breaking commercially available copper phthalocyanine crude, which generally has needle-prismatic shape and a particle size distribution wherein about 50 percent or more of the particles have a particle size in the range from 1.5 to 5 µm, but wherein a significant number of particles, for example, greater than 5 percent, are larger than 9 micrometers, for example, up to 45 µm.

In a preferred method, a large particle size beta copper phthalocyanine crude is air jet milled to the proper particle size.

Although the inventive copper phthalocyanine shows excellent dispersibility and a remarkably good flocculation resistance for a beta copper phthalocyanine pigment, in order to further improve the pigment properties of the inventive copper phthalocyanine pigment, texture-improving agents and/or ant-flocculants are optionally added before, during or after the corresponding preparatory process.

The texture-improving agent or anti-flocculant is preferably incorporated into the inventive beta copper phthalocyanine pigment in an amount of from 0.05 to 20 percent, most preferably 1 to 10 percent, by weight, based on the combined weights of the copper phthalocyanine pigment, texture-improving agent and/or anti-flocculant mixture.

Texture-improving agents are especially useful as an additional component which improves the properties of the inventive beta copper phthalocyanine pigment. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines like laurylamine, or stearylamine. In addition, fatty alcohols or ethoxylated fatty alcohols, polyols, like aliphatic 1,2-diols or polyvinylalcohol and epoxidized soya bean oil, waxes, resin acids and resin acid salts are suitable texture-improving agents.

Anti-flocculants are known in the pigments industry and are, for example, copper phthalocyanine derivatives like for example copper phthalocyanine sulfonic acid or sulfonamide derivatives. However, antiflocculants which are derivatives of a pigment from another pigment class such as those described in U.S. Pat. Nos. 3,386,843; 4,310,359 and/or 4,692,189 are also utilized.

Due to its outstanding chemical resistance, heat stability, weather and light stability, the inventive copper phthalocyanine pigment is highly suitable for the coloration of various substrates such as inorganic materials and in particular high-molecular-weight organic materials. Thus, the present invention relates to a method of coloring a high-molecular-weight organic material which comprises incorporating an effective pigmenting amount of the inventive pigment in the high-molecular-weight organic material and to a composition comprising a high-molecular-weight organic material and an effective pigmenting amount of the inventive copper phthalocyanine pigment.

Generally, an effective pigmenting amount of the copper phthalocyanine pigment is incorporated into the high-molecular-weight organic material to be pigmented. An effective pigmenting amount is any amount suitable to provide the desired color in the high-molecular-weight organic material. In particular, the inventive copper phthalocyanine pigment is used in an amount of 0.01 to 30% by weight, preferably 0.1 to 10% by weight, based on the weight of the high-molecular-weight organic material to be pigmented.

The pigmented, high-molecular-weight organic materials which are colored with the inventive pigment are useful in a variety of applications. For example, the inventive pigment is useful for the pigmentation of lacquers, inks, enamel coating compositions or engineering plastics.

The high-molecular-weight organic materials which are colored with the inventive pigment are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

High-molecular-weight organic materials which are useful for heat-curable coatings or cross-linking, chemically-reactive coatings, are also colored with the inventive pigment. The pigmented, high-molecular-weight organic materials prepared according to the present invention are especially useful in stoving finishes which contain the customary binders and which are reactive at high temperature. Examples of the pigmented, high-molecular-weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented, high-molecular-weight organic materials prepared according to the present invention are also useful as air-drying or physically-drying coatings.

The inventive copper phthalocyanine pigment is particularly suitable for preparing coatings conventionally employed in the automobile industry, especially in acrylic/melamine resin, alkyd/melamine resin or thermoplastic acrylic resin systems, as well as in aqueous based coating systems.

Coatings and ink systems colored with the inventive copper phthalocyanine pigment possess excellent heat, light and weatherfastness, as well as bleed and overspraying fastness properties.

Due to the excellent dispersibility behavior of the beta copper phthalocyanine pigment of this invention, uniform distribution of pigment particles throughout the entire application media is achieved. Compositions containing the new beta copper phthalocyanine pigment show outstanding rheological behavior. Thus, it can be incorporated into an aqueous or solvent based paint system at high concentration.

The inventive copper phthalocyanine pigment shows excellent pigment properties and is applied alone or in the presence of other pigments or dyes in basecoat/clearcoat as well as monocoat automotive or industrial paint and ink systems. The paints show a unique appearance. For example, unique styling effects are achieved when the present pigments are incorporated in conjunction with effect pigments like, for example, graphite, aluminum or titanium dioxide or iron oxide coated mica pigments.

Due to its excellent heat-, weather- and light-stability, the pigment is also incorporated in plastics like films, fibers, or molded articles like, for example, bottle crates. Additionally, it can be very easily incorporated in a resin, like, for example, polypropylene wax, by flushing, a process known in the pigment industry.

The inventive copper phthalocyanine pigment is highly suited for coloring plastics like PVC, HDPE, LDPE, LLDPE, polypropylene and engineering plastics, like, for example, ABS, and polyamide.

The inventive copper phthalocyanine pigment is also suitable as a pigment for colored fibers, in particular, polypropylene and polyamide fibers. Despite its large pigment particle size, no pressure rise is observed in the spinneret. Polyamide fibers colored by the inventive copper phthalocyanine pigment, surprisingly show excellent bleach resistance at low and high pigment concentrations relative to the commercially-available copper phtalocyanines. Thus, the inventive pigment is suitable to replace the abrasive and costly inorganic, cobalt-aluminum pigment currently applied as a blue shading component in polyamide fibers.

The present invention further relates to a process for preparing a conditioned organic pigment, which comprises subjecting an organic pigment, which organic pigment is a pigment crude or a recrystallized, large-particle-size organic pigment, to an air jet milling step. In general, the recrystallized, large-particle-size organic pigment is a pigment wherein the particle size of at least 50 percent of the particles is above 1 $\mu$m, more usually above 2 $\mu$m.

Air jet milling is known and described for example in DE 2042626, U.S. Pat. No. 3,856,215, U.S. Pat. No. 3,648,936, U.S. Pat. No. 3,595,486 and U.S. Pat. No. 3,550,868, which are here incorporated by reference. Air jet mills such as the JET-O-MIZER® or MICRO-JET® are commercially available from Fluid Energy Processing and Equipment Company, Plumsteadville, Pa. 18949.

In general, air jet milling selectively reduces the particle size mainly of those particles in the sample which are outside of the desired particle size range. Thus, the average particle size of the air-jet-milled sample usually changes only slightly after the milling step, but the particle size distribution of the particles in the sample is within a much narrower range.

In comparison to other conditioning methods, for example wet milling, the air jet milling process provides pigment particles with fewer small splinter particles. The pigmentary crystal fragments maintain a clean, practically unbroken surface, as is seen by electron microscopy. For this reason, air jet milling yields a pigment with higher reflection and different flop behavior relative to a pigment obtained by other known conditioning methods.

Since no organic solvents are involved, the air jet milling process is a practical, environmentally friendly conditioning method. The desired particle size range is easily achieved by an expert utilizing the appropriate equipment and air pressure. Additionally, depending on the set up, it is possible to run such a mill continuously. The requisite milling conditions are readily ascertained by measuring the pigment particle size; for example by an electron micrograph or by laser diffraction using a Fraunhofer diffraction instrument.

As discussed above, the present invention relates to a process for preparing a conditioned pigment, which comprises subjecting an organic pigment to an air jet milling step, which organic pigment is a pigment crude or a recrystallized large-particle-size organic pigment, in particular wherein the organic pigment is an azo, azomethine, methine, dioxazine, anthraquinone, phthalocyanine, perinone, perylene, diketopyrrolopyrrole, thioindigo, iminoisoindoline, iminoisoindolinone, flavanthrone, indanthrone, anthrapyrimidine or quinophthalone pigment.

A preferred embodiment of this aspect of the present invention is the process wherein at least 95 percent of the particles in the conditioned pigment have a particle size in the range from 0.1 micrometers to 9 micrometers with at least 50 percent of the particles having a particle size in the range from 0.5 micrometers to 3.5 micrometers. Preferably, at least 50 percent of the particles have a particle size in the range from 0.8 to 2.5 micrometers, especially wherein the conditioned pigment is a diketopyrrolopyrrole, phthalocyanine, indanthrone, iminoisoindolinone, or iminoisoindoline, preferably a copper phthalocyanine pigment, most preferably a beta copper phthalocyanine. Preferably the conditioned copper phthalocyanine pigment is prepared by air jet milling a copper phthalocyanine crude, preferably an alpha or beta copper phthalocyanine crude.

The following examples further describe the embodiments of the invention, but do not limit the scope of the invention. In the examples, all parts are by weight unless otherwise indicated.

EXAMPLE 1

500 grams of beta copper phthalocyanine crude (from PHTHALCHEM PCL GROUP Inc. Cincinnati, Ohio 45232) having a needle-prismatic particle shape and an average particle size of from 2.0–3.0 $\mu$m, but containing particles of up to 44 $\mu$m, is air jet milled such that the larger particles are reduced to a particle size of below 9 $\mu$m on a MICRO-JET® air pulverizer from Fluid Energy Aljet, Plumsteadville Pa.

The resulting product shows a particle size distribution of 30% from 0.2 to 0.8 $\mu$m, 40% from 0.8 to 2.1 $\mu$m and 30% from 2.1 to 8 $\mu$m measured by a laser diffraction particle analyzer (MICROTRAC).

The electron micrograph shows particles with a marked prismatic shape wherein 50 percent of the particles display a length of from 2 to 4.5 $\mu$m length and a width of from 0.3 to 1.1 $\mu$m. The crystals show clear broken edges with few small splinter particles below 0.2 $\mu$m.

EXAMPLES 2A TO 2D

This example shows the incorporation of the inventive copper phthalocyanine pigment in masstone, tint, and in combination with TiO2 coated mica pigments in a basecoat/clearcoat automotive system. Due to its excellent dispersibility properties the inventive pigment is incorporated advantageously as a stir-in pigment, avoiding the energy and time consuming dispersion step in a bead mill.

Resin solutions are prepared as follows:

I. Solid Clear Solution

The following ingredients are stirred together to provide a solid clear solutions containing 57.53% solids:
1171 grams of a non aqueous dispersion resin (NAD-resin),
719.1 grams of a melamine resin,
269.4 grams of a solvent mixture of aliphatic and aromatic hydrocarbons (SOLVESSO 100),
597.6 grams of polyester urethane resin,
125.1 grams of a catalyst solution, and
120 grams of butanol.

II. Metallic Clear Solution

The following ingredients are stirred together to provide a "metallic clear solution" containing 59.2% solids:
1353.0 grams of a non aqueous dispersion resin,
786.2 grams of melamine resin,
144.6 grams of xylene,
65.6 grams of UV Screener Solution,
471.6 grams of acrylourethane resin,
89.0 grams of catalyst solution, and
90.0 grams of methanol.

III. Mica Dispersion

The following ingredients are stirred together to provide a mica dispersion containing 27.9% pearlescent mica pigment and a total solid content of 69.1% solids:
251.1 grams of bright white mica, EXTERIOR MEARLIN from The Mearl Corp.,
315.0 grams of NAD-resin, and
180.0 grams of acrylourethane resin.

IV. Blue Pigment Dispersion

The following ingredients are stirred together in an ½ pint can:
66.0 grams of acrylourethane resin,
14.5 grams of AB-dispersant, and
58.1 grams of SOLVESSO 100.

26.4 grams of the beta copper phthalocyanine pigment obtained according to Example 1 are then added to the above resin/solvent mixture as a stir-in pigment. The blue pigment dispersion is stirred at slow to medium speed for 15 to 20 minutes, providing a homogeneous non-viscous stir-in pigment dispersion containing 16.0% phthalocyanine pigment, a total solid content of 48% solids in a pigment to binder ratio of 0.5.

V. TiO$_2$-dispersion

A TiO$_2$ dispersion is prepared by mixing the following ingredients in a quart can:
604.1 grams of a TiO$_2$ pigment,
129.8 grams of acrylourethane resin, and
161.1 grams of SOLVESSO 100.

1 pint of ½" ceramic balls are then added. The dispersion is then milled for 24 hours. The white pigment dispersion is separated from the balls yielding a "TiO 2 dispersion" containing 67.5% pigment with a total solid content of 77.4% solids.

EXAMPLE 2A

Masstone Color Shade 53.5 grams "blue pigment dispersion IV" and 76.5 grams "solid clear solution I" are combined with stirring. The blue resin/pigment dispersion is sprayed onto a primed aluminum panel twice in a 1.5 minute interval as basecoat. After 2 minutes, clearcoat resin is sprayed twice at 1½ minute intervals onto the basecoat. The sprayed panel is then flashed with air in a flash cabinet for 10 minutes and then "baked" in an oven at 250° F. (121° C.) for 30 minutes, yielding a high chroma blue colored panel in which the basecoat has a thickness of around 0.8 mm and the clearcoat of around 1.5 mm. The panels show an excellent weatherability. The following coloristic data are obtained utilizing a MACBETH COLOR EYE 3000 spectrophotometer.

Reflection Measurement Data

| wavelength nm | reflection % | wavelength nm | reflection % | wavelength nm | reflection % |
| --- | --- | --- | --- | --- | --- |
| 400 | 4.84 | 500 | 4.41 | 600 | 4.77 |
| 420 | 5.18 | 520 | 4.15 | 620 | 4.85 |
| 440 | 6.14 | 540 | 4.2 | 640 | 4.81 |
| 460 | 6.66 | 560 | 4.48 | 660 | 4.62 |
| 480 | 5.34 | 580 | 4.62 | 680 | 4.56 |
| 500 | 4.41 | 600 | 4.77 | 700 | 4.77 |

The above reflection data correspond to the following C.I.E. (1964) L*, a*, b*, C* and h color space value numbers using a D65 illuminant and 10 degree observer with a specular component included:

L*=25.52; a*=3.98; b*=−6.42; C*=7.55; h=301.81

EXAMPLE 2B

An 80/20 white mica shade is prepared by mixing the following ingredients:

| | |
| --- | --- |
| 46.1 grams | "blue pigment dispersion IV" |
| 6.6 grams | "mica dispersion III" |
| 6.9 grams | NAD resin, |
| 70.4 grams | "metallic clear solution II" |

The blue pigment/pearlescent mica/resin dispersion is sprayed onto a panel followed by a clearcoat as described in Example 2A. A blue effect color paint is obtained which shows excellent weatherability. The pigment particles are homogeneously distributed in the coating system. Additionally, the painted panel shows a high gloss and a strong flop from reddish blue to greenish blue when viewed from different angles.

EXAMPLE 2C

A 50/50 white mica shade is prepared by mixing the following ingredients:

| | |
|---|---|
| 29.9 grams | "blue pigment dispersion IV" |
| 17.1 grams | "mica dispersion III" |
| 6.4 grams | acrylourethane resin, |
| 3.6 grams | NAD resin, |
| 73.0 grams | "metallic clear solution II". |

The blue pigment/pearlescent mica/resin dispersion is sprayed onto a panel followed by a clearcoat as described in Example 2A. A blue effect color paint is obtained which shows an attractive flop from reddish blue to greenish blue and excellent weatherability and gloss properties. The pigment particles are homogeneously distributed in the coating system.

EXAMPLE 2D

A 10/90 tint shade is prepared by mixing the following ingredients:

| | |
|---|---|
| 7.7 grams | "blue pigment dispersion IV" |
| 16.4 grams | "TiO$_2$ dispersion V", |
| 14.3 grams | acrylourethane resin, |
| 61.6 grams | "solid clear solution I" |

The blue pigment/TiO$_2$/resin dispersion is sprayed onto a panel followed by a clearcoat as described in Example 2A, yielding a high gloss blue tinted panel in which the pigment particles are homogeneously dispersed.

The following coloristic data were measured utilizing a MACBETH COLOR EYE spectrophotometer:

Reflection Measurement Data

| wavelength nm | reflection % | wavelength nm | reflection % | wavelength nm | reflection % |
|---|---|---|---|---|---|
| 400 | 22.03 | 500 | 48.55 | 600 | 25.41 |
| 420 | 40.94 | 520 | 41.74 | 620 | 23.61 |
| 440 | 49.42 | 540 | 35.83 | 640 | 22.31 |
| 460 | 55.61 | 560 | 31.10 | 660 | 21.62 |
| 480 | 53.79 | 580 | 27.60 | 680 | 21.07 |
| 500 | 48.55 | 600 | 25.41 | 700 | 20.25 |

The above reflection data correspond to the following C.I.E. (1964) L*, a*, b*, C* and h color space value numbers using a D65 illuminant and 10 degree observer with a specular component included:

L*=65.80; a*=-11.49; b*=-17.94; C*=21.31; h=237.36

EXAMPLE 3

63.0 grams of polyvinylchloride, 3.0. grams epoxidized soya bean oil, 2.0 grams of barium/cadmium heat stabilizer, 32.0 grams dioctyl phthalate and 1.0 gram of the copper phthalocyanine prepared according to Example 1 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive blue shade with excellent fastness to heat, light and migration.

EXAMPLE 4

5 grams of the copper phthalocyanine pigment prepared according to Example 1, 2.5 grams hindered amine light stabilizer, 1.0 gram benzotriazole UV absorber, 1.0 gram hindered phenol antioxidant and 1.0 gram phosphite process stabilizer are mixed together with 1000 grams of high density polyethylene at a speed of 175–200 rpm for 30 seconds after flux. The fluxed pigmented resin is chopped up while warm and malleable, and then fed through a granulator. The resulting granules are molded on an injection molder with a 5 minute dwell time and a 30 second cycle time at a temperature of 312° C. Homogeneously blue colored chips which show an excellent light stability are obtained

EXAMPLE 5

1000 grams of polypropylene granules (DAPLEN PT-55®, from Chemie Linz) and 10 grams of the copper phthalocyanine pigment obtained in Example 1 are thoroughly mixed in a mixing drum. The granules so obtained are melt spun at 260°–285° C. to blue filaments of good light fastness and textile fiber properties.

I claim:

1. A copper phthalocyanine pigment which is not platelet-shaped, wherein at least 95 percent of the pigment particles have a particle size in the range from 0.1 micrometers to 9 micrometers and at least 50 percent of the particles have a particle size in the range from 0.8 to 2.5 micrometers and which is characterized by a 10/90 tint reflection spectrum, which is measured from a panel coated to complete hide with a basecoat/clearcoat paint system, having a broad peak extending from 400 to 700 nm with a maximum at 460 nm±10 nm, a negative slope extending from 480 nm to 700 nm which becomes less negative as the wavelength increases and a reflection at 700 nm that is at least 25 percent of the reflection at 460 nm.

2. A copper phthalocyanine pigment of claim 1 which has a masstone reflection spectrum measured from a panel coated to complete hide with a basecoat/clearcoat paint system characterized by a first peak extending from 400 nm to 520 nm with a maximum at 460 nm±10 nm, a second peak extending from 540 to 680 nm having a maximum at 630 nm±10 nm and having a positive slope from 680 to 700 nm.

3. A copper phthalocyanine pigment of claim 2 characterized by a masstone reflection spectrum having a maxima above 6 percent at 460 nm±10 nm and a reflection at 480 nm above 5 percent, a reflection at 620 nm above 4.6 percent and a reflection at 700 nm above 4.5 percent and a 10/90 tint reflection spectrum having a maxima above 52 percent at 460 nm±10 nm, and a reflection at 500 nm above 45 percent, a reflection at 600 nm above 22 percent and a reflection at 700 nm above 17 percent, the reflection spectra being measured from a panel coated to complete hide with a basecoat/clearcoat paint system.

4. A copper phthalocyanine pigment of claim 3 wherein the masstone reflection spectrum has a reflection at 480 nm above 5.3 percent, a reflection at 620 nm above 4.7 percent and a reflection at 700 nm above 4.7 percent.

5. A copper phthalocyanine pigment of claim 1 wherein the tint reflection spectrum has a reflection at 500 nm above 47 percent, a reflection at 600 nm above 24 percent and a reflection at 700 nm above 19 percent.

6. A copper phthalocyanine pigment of claim 3 wherein the masstone reflection spectrum has a reflection at 480 nm of from 5.3 to 5.4 percent, a reflection at 620 nm of from 4.7 to 4.9 percent and a reflection at 700 nm of from 4.7 to 4.8 percent.

7. A copper phthalocyanine pigment of claim 5 wherein the tint reflection spectrum has a reflection at 500 nm of above 47.5 percent, and reflection at 600 nm of above 24.5 percent.

8. A copper phthalocyanine pigment of claim 7 wherein the tint reflection spectrum is characterized by a reflection maxima at 460 nm of above 55.0 percent and a reflection at 500 nm of above 48.0 percent, a reflection at 600 nm of above 25.0 percent and a reflection at 700 nm of above 20.0 percent.

9. A copper phthalocyanine pigment of claim 1 composed primarily of pigment particles having a prismatic shape.

10. A copper phthalocyanine pigment of claim 1, which shows a flop from greenish blue to reddish blue when combined with a titanium dioxide coated mica or aluminum effect pigment in a basecoat/clearcoat coating.

11. A composition comprising a high-molecular-weight organic material and an effective pigmenting amount of a copper phthalocyanine pigment according to claim 1.

12. A composition comprising a high-molecular-weight organic material and an effective pigmenting amount of a copper phthalocyanine pigment according to claim 1.

13. A composition of claim 12, wherein said high-molecular-weight organic material is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

14. A composition of claim 12, wherein said high-molecular-weight organic material is an aqueous or solvent based automotive paint system.

15. A composition of claim 12, wherein said high-molecular-weight organic material is a plastic that is subsequently calendered, cast, molded or processed to fibers.

16. A process for coloring a high-molecular-weight organic material which comprises incorporating an effective pigmenting amount of the pigment of claim 1 in the high-molecular-weight organic material.

* * * * *